(12) United States Patent
Kinme et al.

(10) Patent No.: US 7,127,921 B2
(45) Date of Patent: Oct. 31, 2006

(54) LOCKING DEVICE FOR STEERING SHAFT AND STEERING APPARATUS HAVING THE DEVICE

(75) Inventors: Shigetaka Kinme, Kashihara (JP); Norio Hosomi, Kashiwara (JP); Kenichi Aota, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 71 days.

(21) Appl. No.: 10/372,840

(22) Filed: Feb. 26, 2003

(65) Prior Publication Data

US 2003/0160413 A1  Aug. 28, 2003

(30) Foreign Application Priority Data

Feb. 27, 2002  (JP) .............................. 2002-051529

(51) Int. Cl.
*E05B 65/12* (2006.01)
(52) U.S. Cl. .......................................... 70/252; 70/185
(58) Field of Classification Search .......... 70/181–189, 70/252
See application file for complete search history.

(56) References Cited

U.S. PATENT DOCUMENTS

| | | | | |
|---|---|---|---|---|
| 1,664,620 A | * | 4/1928 | Gillen ........................... | 70/252 |
| 2,874,562 A | * | 2/1959 | Cross ........................... | 70/252 |
| 2,890,581 A | * | 6/1959 | Lewis ........................... | 70/252 |
| 3,596,483 A | * | 8/1971 | Elliott .......................... | 70/252 |
| 3,703,092 A | * | 11/1972 | Elliott .......................... | 70/252 |
| 3,723,682 A | * | 3/1973 | Pecott .......................... | 70/184 |
| 4,771,618 A | * | 9/1988 | Weber et al. .................. | 70/185 |
| 5,016,454 A | * | 5/1991 | Al-Sheikh .................... | 70/185 |
| 5,214,982 A | * | 6/1993 | Shieh ............................ | 70/186 |
| 5,454,238 A | * | 10/1995 | Ross et al. .................... | 70/186 |
| 6,000,489 A | * | 12/1999 | Rick ............................. | 70/186 |
| 6,076,382 A | | 6/2000 | Naganuma | |
| 6,237,378 B1 | * | 5/2001 | Canard ......................... | 70/252 |
| 6,647,751 B1 | * | 11/2003 | Zillmann ...................... | 70/186 |

FOREIGN PATENT DOCUMENTS

| | | |
|---|---|---|
| EP | 0 630 800 A1 | 12/1994 |
| FR | 2 793 749 A1 | 11/2000 |
| JP | 57-191149 A | 11/1982 |
| JP | 07-277142 A | 10/1995 |
| JP | 10-067331 | 3/1998 |
| JP | 10-315986 A | 12/1998 |
| JP | 2000-344053 | 12/2000 |
| JP | 2001219816 | 8/2001 |

* cited by examiner

*Primary Examiner*—Suzanne Dino Barrett
*Assistant Examiner*—Christopher Boswell
(74) *Attorney, Agent, or Firm*—Birch, Stewart, Kolasch & Birch, LLP

(57) ABSTRACT

Engagement parts 52c of the locking device for a steering shaft are formed on a side face of a driven gear of a reduction gear mechanism which is fastened to a steering shaft 2. Since a locking part 6a is arranged near the reduction gear mechanism, elements related to a locking function can be removed from the key cylinder of the engine key, so that the key cylinder of the engine key can be downsized, or can be arranged in another position. Consequently, even in a state where a reduction gear mechanism, a steering assist motor and the like are arranged in the middle of the steering shaft, a longer stroke of the impact absorbing mechanism in comparison with conventional mechanisms can be ensured, utilizing a decrease in length of the downsized or reduced key cylinder in the axial direction of the steering shaft 2.

13 Claims, 4 Drawing Sheets

LOCKING DEVICE FOR STEERING SHAFT AND STEERING APPARATUS HAVING THE DEVICE

BACKGROUND OF THE INVENTION

1. Field of the Invention

The present invention relates to a locking device for locking a steering shaft so as to keep the shaft from turning while the car is not used, and to a steering apparatus provided with the locking device.

2. Description of Related Art

For preventing theft during parking, cars are provided with a locking device for locking a steering shaft which is used for transmitting rotation of a steering wheel to a steering mechanism.

FIG. 1 is a sectional view illustrating an essential part of a conventional locking device for a steering shaft. As disclosed in Japanese Patent Application Laid-Open No. 57-191149 (1982), for example, a conventional locking device has a key cylinder 109 of an engine key which is fastened to an upper portion of an upper shaft housing 107 for supporting a steering shaft 101 connected to a steering wheel 100. The key cylinder 109 is connected with a lock key 108 which slides into the upper shaft housing 107 by an operation of the key cylinder 109. A key way 110, which engages with the lock key 108 when the lock key 108 sides into the upper shaft housing 107, is formed on a collar 111 fastened on the peripheral surface of the steering shaft 101. The steering shaft 101 is locked and kept from turning when the lock key 108 and the key way 110 engage with each other.

Cars are also provided with an impact absorbing mechanism for reducing impact of collision or the like, which has caused an external force, when an excessively large external force is applied to the steering wheel 100 in the axial direction of the steering shaft 101 at the time of the collision.

A generally used impact absorbing mechanism is constituted of a hollow upper shaft 102 which has an upper end connected with the steering wheel 100 and an open lower end; a lower shaft 103 which has an upper end fitted in the lower end of the upper shaft 102 with relative turn thereof with regard to the upper shaft 102 being prohibited and movement thereof in the axial direction being allowed; a stopper 105, which is made of synthetic resin filled in a groove extending over the circumference of a portion of the lower shaft 103 to be fitted in the upper shaft 102 and a through bore formed on the upper shaft 102 in correspondence with the groove, for restraining the upper shaft 102 and the lower shaft 103 in the axial direction; the upper shaft housing 107 for supporting the upper shaft 102 with rotation thereof being allowed and relative movement thereof in the axial direction with regard to the upper shaft housing 107 being prohibited; a lower shaft housing 106, which supports the lower shaft 103 so as to be rotatable, having an upper end fitted in the lower end of the upper shaft housing 107; and a cylindrical impact energy absorber 104 interposed between a portion of the upper shaft housing 107 to be fitted with the lower shaft housing 106 and a portion of the lower shaft housing 106 to be fitted with the upper shaft housing 107.

With such a structure, when an excessively large external force is applied to the steering wheel 100 in the axial direction of the steering shaft 101 at the time of collision or the like, the stopper 105 is sheared at the interface between the upper shaft 102 and the lower shaft 103, so that relative movement of the upper shaft 102 in the axial direction with regard to the lower shaft 103 is allowed. In this state, the external force applied to the steering wheel 100 is transmitted to the impact energy absorber 104 via the upper shaft 102, a snap ring 112 and the upper shaft housing 107. As the impact energy absorber 104 absorbs energy of the external force, the upper shaft 102 and the upper shaft housing 107 move downward with regard to the lower shaft housing 106 within a predetermined range of stroke length, so as to absorb the impact of the collision which has caused the external force.

The locking device and the impact absorbing mechanism mentioned above can be employed for a vehicle having an electric power steering apparatus. Some electric power steering apparatuses are provided with a steering assist motor, wherein a driven gear of a reduction gear mechanism, which is driven by rotation of the motor, is fastened at the middle of a lower shaft of a steering shaft.

In a vehicle provided with an electric power steering apparatus in which a driven gear is fastened at the middle of a lower shaft of a steering shaft as described above, it is more difficult to ensure a stroke length of the impact absorbing mechanism, in comparison with a vehicle which does not have a steering assist motor or a reduction gear mechanism at the middle of the steering shaft. Consequently, a conventional vehicle having an electric power steering apparatus thus constructed can not meet a recent demand for an increase in stroke length to further enhance the safety at the time of collision.

Moreover, there is another demand for ensured strength of the key way high enough to prevent a plan for breaking the key way to steer the vehicle by applying large torque to the steering wheel repeatedly to make the lock key collide with a side face of the key way repeatedly.

BRIEF SUMMARY OF THE INVENTION

The present invention has been made with the aim of coping with the above demands, and it is an object thereof to provide a locking device for a steering shaft and a steering apparatus having the locking device which can ensure a stroke length of an impact absorbing mechanism longer than conventional devices in spite of the existence of a gear fastened at the middle of a lower shaft of the steering shaft.

Another object of the invention is to provide a locking device for a steering shaft and a steering apparatus having the locking device in which a side face of an engagement part is not damaged even if large torque is repeatedly applied to the steering wheel.

Still another object of the invention is to provide a locking device for a steering shaft and a steering apparatus having the locking device which can lock the steering shaft electrically.

A locking device according to the present invention is used for a steering shaft having a gear fastened thereon. The locking device for a steering shaft comprises: a locking part which slides into a housing of the steering shaft; and an engagement part which engages with an end portion of the locking part on the side of the engagement part when the locking part slides into the housing. The steering shaft is locked and kept from turning when the locking part and the engagement part engage with each other. The engagement part is formed on a side face of the gear.

With this locking device for a steering shaft, the locking part can be arranged near the reduction gear mechanism, and thereby elements related to a locking function can be removed from the key cylinder of the engine key. Accordingly, the key cylinder of the engine key can be downsized, or can be arranged in another position, such as on a front panel. Consequently, the stroke length of the impact absorbing mechanism can be increased. Moreover, since the locking part and the engagement part engage with each other in a position far from an axis of the steering shaft in comparison with conventional devices, the locking part and a member, into which the locking part slides, can be downsized in comparison with conventional devices.

In the locking device for a steering shaft according to the present invention, the engagement part may be configured as a hole into which the end portion of the locking part can slide.

With this locking device for a steering shaft, in which the engagement part is formed on the side face of the driven gear of the reduction gear mechanism, and not on the peripheral surface of the steering shaft, an enough thickness of the engagement part can be ensured. Consequently, the side face of the engagement part is not damaged even if large torque is repeatedly applied to the steering shaft.

In the locking device for a steering shaft according to the present invention, the locking part may be connected with an electric actuator.

With this locking device for a steering shaft, slide-in of the locking part can be electrically controlled and the steering shaft can be locked in conjunction with an operation of the engine key, even in a state where the locking part is arranged near the reduction gear mechanism and the key cylinder of the engine key is arranged on the front panel.

The steering apparatus according to the present invention comprises: a steering shaft; a housing for supporting the steering shaft; a gear fastened to the steering shaft; and a locking device according to the present invention.

With this steering apparatus, the stroke length of the impact absorbing mechanism can be increased in comparison with conventional apparatuses. Moreover, the side face of the engagement part is not damaged even if large torque is repeatedly applied to the steering shaft. Furthermore, the steering shaft can be locked electrically.

The above and further objects and features of the invention will more fully be apparent from the following detailed description with accompanying drawings.

DETAILED DESCRIPTION OF THE INVENTION

Figure 1:
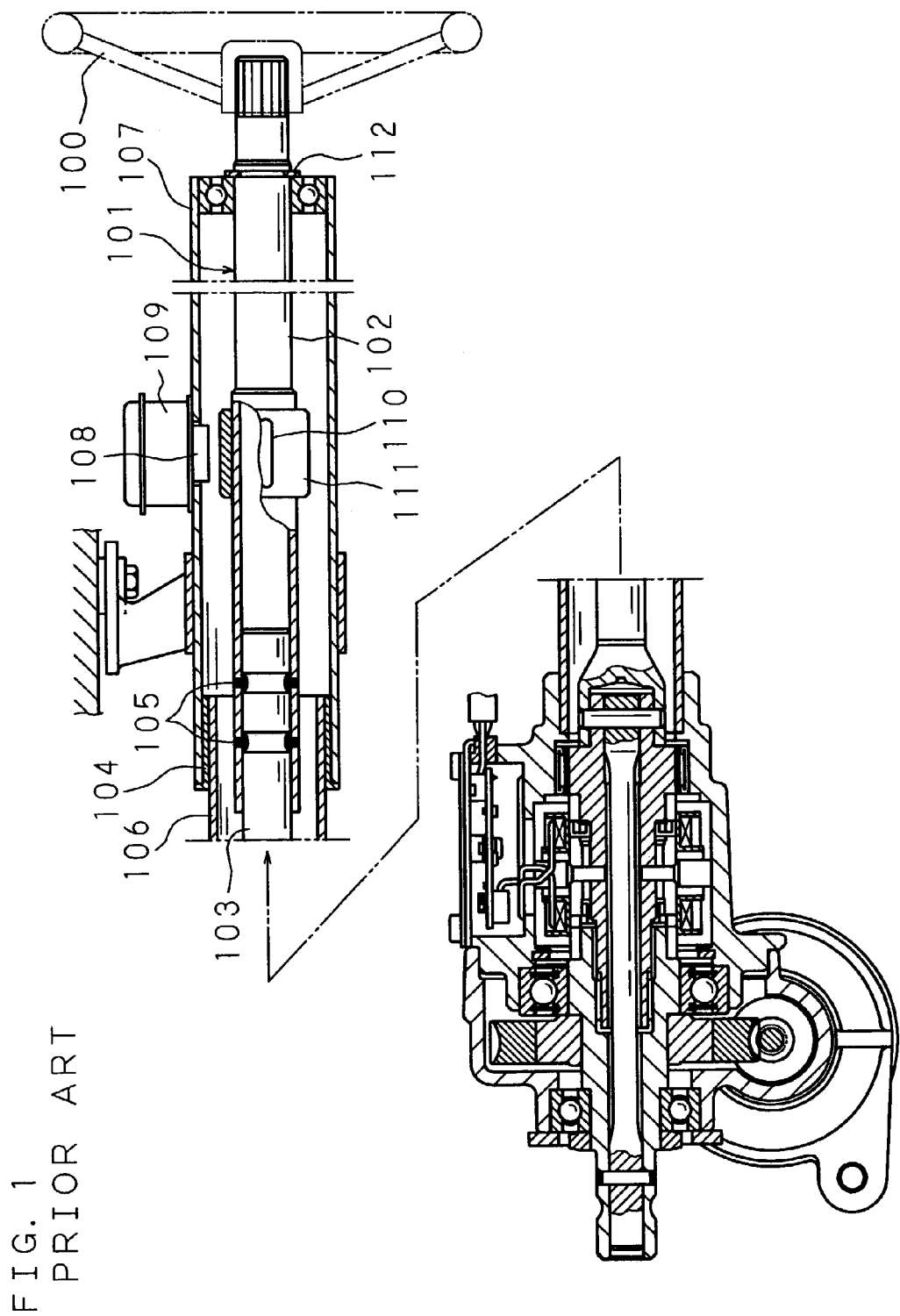
FIG. 1 is a sectional view illustrating an essential part of a conventional locking device for a steering shaft.
Figure 2:
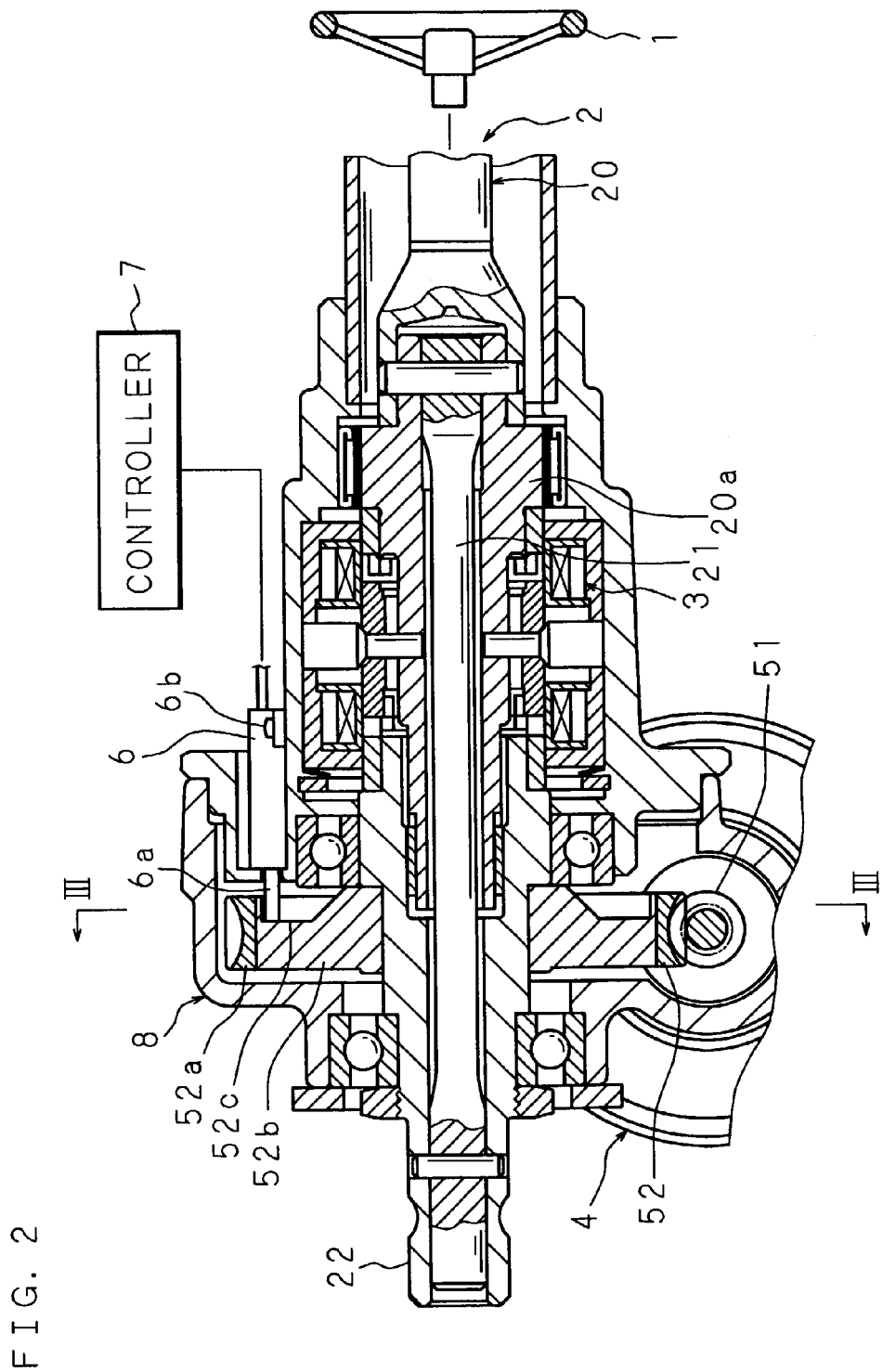
FIG. 2 is a sectional view of an essential part of a locking device for a steering shaft according to the present invention, which illustrates a state where the steering shaft is locked by the locking device.
Figure 3:
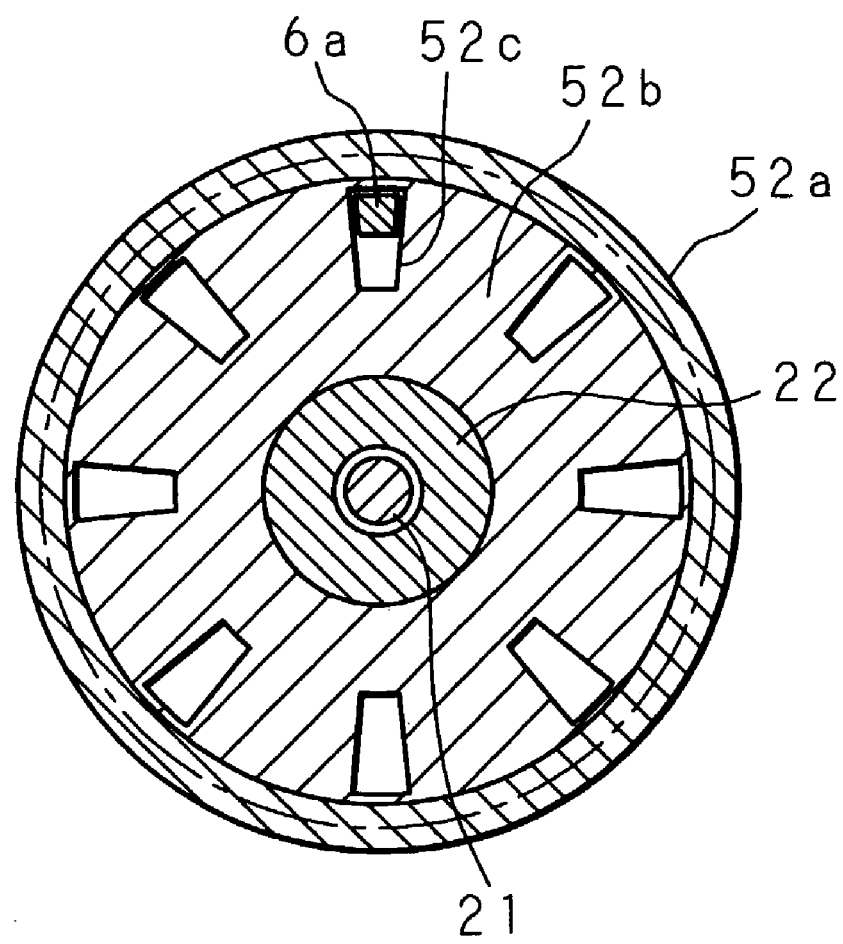
FIG. 3 is a sectional view illustrating an essential part, taken along the line III—III in FIG. 2.

The following description will explain the present invention in detail with reference to the drawings illustrating an embodiment thereof. FIG. 2 is a sectional view of an essential part of a locking device for a steering shaft according to the present invention, which illustrates a state where the steering shaft is locked by the locking device; and FIG. 3 is a sectional view illustrating an essential part, taken along the line III—III in FIG. 2.

The reference numeral 2 in figures indicates a steering shaft. The steering shaft 2 is composed of an upper shaft 20, a cylinder part 20a, a torsion bar 21 and a lower shaft 22. The upper end of the upper shaft 20 is connected with a steering wheel 1. A portion of the upper shaft 20 covering a predetermined length from the lower end is formed cylindrically and fitted on the upper end of the cylinder part 20a. An upper portion of the torsion bar 21 is inserted in the cylinder part 20a. The upper end of the cylinder part 20a and the upper end of the torsion bar 21 are coaxially pin-connected with the lower end of the upper shaft 20. The lower shaft 22 is formed cylindrically, and a lower portion of the torsion bar 21 is inserted in the lower shaft 22. The lower end of the torsion bar 21 is coaxially connected with the lower end of the lower shaft 22. An upper portion of the lower shaft 22 is fitted on outer surface of a lower portion of the cylinder part 20a in a spaced manner, and the lower end of the lower shaft 22 is connected with a steering mechanism joined to tire wheels which are not illustrated in the figures.

A torque sensor 3 is arranged near a position where the cylinder part 20a and the lower shaft 22 is fitted to each other in a spaced manner. The torque sensor 3 detects a steering torque applied to the steering wheel 1 on the basis of the amount of relative rotational displacement between the upper shaft 20 and the lower shaft 22. The relative rotational displacement between the upper shaft 20 and the lower shaft 22 is generated by a twist of the torsion bar 21 caused by the steering torque. An output shaft of a steering assist motor 4, which is driven on the basis of the steering torque detected by the torque sensor 3, is connected with a worm 51. A worm wheel 52 which engages with the worm 51 is fastened to the lower shaft 22. The cylinder part 20a, lower shaft 22, torque sensor 3 and worm wheel 52 are housed in a housing 8.

The worm wheel 52 comprises: an annular tooth part 52a, which is made of synthetic resin, for example, nylon resin, having a plurality of teeth to be engaged with the worm 51; and a retainer 52b made of metal, which is fitted inside the tooth part 52a. The lower shaft 22 is fixed in a through bore provided at a center portion of the retainer 52b. A plurality of engagement parts 52c to be engaged with a locking part 6a of a locking device according to the present invention are formed at a peripheral portion of a side face of the retainer 52b on an upper side (i.e., the right side in FIG. 2). The engagement parts 52c, each of which is a sectorial hole, are formed in a radial pattern with regard to the center of the side face of the retainer 52b.

The locking part 6a is a rod having an approximately square section, which can slide into one of the engagement parts 52c. An end portion (the right end portion in FIG. 2) of the locking part 6a is connected to a movable iron core in a solenoid which constitutes an electric actuator 6. The movable iron core is always biased in a direction from one end portion (the right end portion in FIG. 2) of the locking part 6a to the other end portion (the left end portion in FIG. 2) by a spring, which is not illustrated in the figures, provided in the electric actuator 6. On the other hand, the movable iron core is magnetized so as to move in a direction from the other end portion mentioned above (the left end portion in FIG. 2) of the locking part 6a to the one end portion mentioned above (the right end portion in FIG. 2) when electricity is supplied to the solenoid. The electric actuator 6 is fastened to the housing 8 by screws 6b with the other end portion mentioned above of the locking part 6a being positioned on the lower side, so that the movable iron core of the solenoid moves up and down. The position where the electric actuator 6 is fastened is such determined that the other end portion mentioned above of the locking part 6a can slide into any one of the engagement parts 52c when the locking part 6a slides downward into the housing 8. The on/off of electricity supply to the solenoid is controlled by a controller 7 which is arranged in a suitable position. Electricity supply to the solenoid is turned on by performing a predetermined operation, such as turning on the engine key or pressing a wireless auto-lock button provided on the engine key of the vehicle, and electricity supply to the solenoid is turned off by performing another predetermined operation, such as turning off the engine key or re-pressing a wireless auto-lock button provided on the engine key of the vehicle.

Though this embodiment employs the worm wheel 52 composed of the tooth part 52a made of resin and the retainer 52b made of metal, the present invention is not limited to this. The worm wheel 52 may by made up, for example, in a manner that the whole part is made of metal, or the whole part is made of synthetic resin. Moreover, though this embodiment employs a plurality of engagement parts 52c formed in a sectorial shape, the present invention is not limited to this. Only one engagement part 52c works, and the shape may be, for example, a circle. Moreover, though this embodiment employs engagement parts 52c configured as holes, the present invention is not limited to this. The engagement part 52c may be, for example, a projection. Furthermore, though this embodiment employs the structure wherein the engagement parts 52c are provided on the upper side face of the retainer 52b, the engagement parts 52c may be provided on the lower side face instead.

Moreover, though this embodiment employs the structure wherein the locking part 6a is connected with the movable iron core in the solenoid of the electric actuator 6, the present invention is not limited to this. The locking part 6a may be connected with other elements, such as a unit constructed of a motor and a gear mechanism.

As described above, the electric actuator 6 can make the locking part 6a slide into the housing 8. Accordingly, when the controller 7 turns off the electricity supply to the solenoid of the electric actuator 6, the upward magnetization of the movable iron core is stopped, and the spring of the electric actuator 6 makes the locking part 6a connected to the movable iron core slide into the housing 8. After sliding into the housing 8, the locking part 6a slides into and engages with any one of the engagement parts 52c formed on a side face of the worm wheel 52, so that the steering shaft 2 is locked. There is a case where the worm wheel 52 is in a rotational position that makes the locking part 6a slide into the housing 8 when a side face of a portion, where none of the catching parts 52c is formed, is positioned under the locking part 6a. In this case, the locking part 6a is pressed against the side face of the worm wheel 52 by the spring. When the steering wheel 1 is rotated in such a state and any one of the engagement parts 52c is positioned under the locking part 6a, the locking part 6a slides into and engages with the one engagement part 52c, so that the steering shaft 2 is locked.

Figure 4:
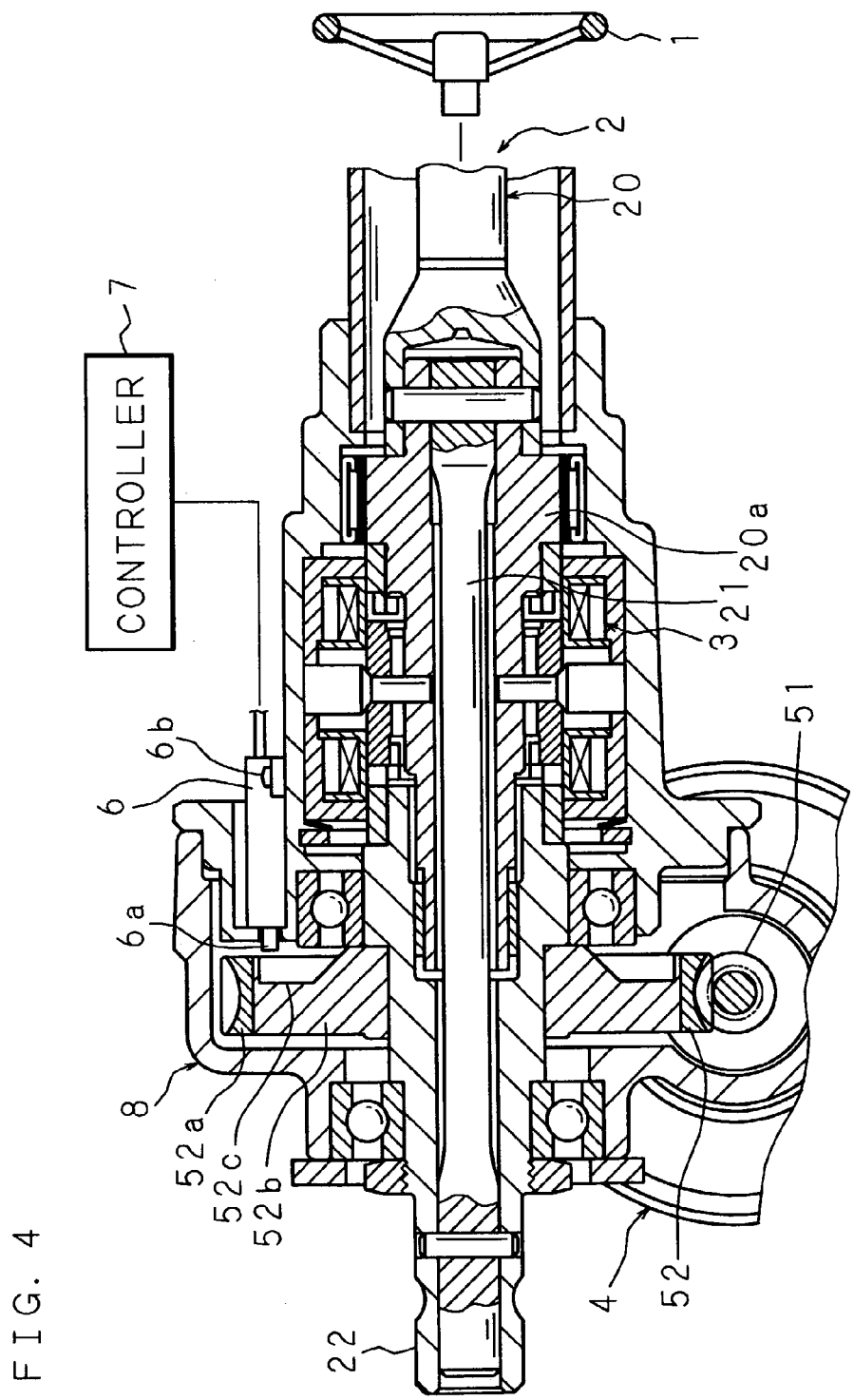
FIG. 4 is a sectional view of an essential part of a locking device for a steering shaft according to the present invention, which illustrates a state where locking of the steering shaft by the locking device is released.

FIG. 4 is a sectional view of an essential part of a locking device for a steering shaft according to the present invention, which illustrates a state where locking of the steering shaft by the locking device is released.

For releasing the locking of the steering shaft 2, operations as described below are performed. The controller 7 supplies electricity to the solenoid of the electric actuator 6 when, for example, the engine key is turned on, or when the wireless auto-lock button provided on the engine key of the vehicle is pressed. Then, the solenoid supplies the movable iron core with upward magnetization overwhelming the biasing force generated by the spring of the electric actuator 6, so that the locking part 6a connected with the movable iron core is moved back. As the locking part 6a slides back, the engagement between the locking part 6a and one of the engagement parts 52c is released, and thereby the steering shaft 2 is unlocked.

As described above, the present invention employs such a structure that engagement parts 52c of the locking device for a steering shaft are provided on a side face of the worm wheel 52 fastened on the steering shaft 2 and the locking part 6a and the electric actuator 6 are arranged in appropriate positions to engage with any one of the engagement parts 52c. As a result, elements related to a locking function can be removed from the key cylinder of the engine key, and thereby the key cylinder of the engine key can be downsized, or can be arranged in another position, such as on a front panel. Accordingly, the stroke length of the impact absorbing mechanism can be increased in correspondence to the length of downsized or removed key cylinder in the axial direction of the steering shaft. In other words, the length, over which the upper shaft housing is moved by the impact of the collision or the like with the impact energy being absorbed by the impact energy absorber, is increased. Consequently, an impact absorbing mechanism which absorbs more impact energy than conventional mechanisms can be realized Though conventional locking devices for steering shafts have engagement parts on a peripheral surface of the steering shafts, the locking device for a steering shaft according to the present invention has engagement parts 52c on a side face of the worm wheel 52. Accordingly, in the present invention with the engagement parts 52c having an enough thickness on the side face thereof, the side face of the engagement parts 52c is not damaged even if large torque is repeatedly applied to the steering wheel 1 and the locking part 6a repeatedly collides with the side face of the engagement parts 52c. Moreover, in the present invention in which the locking part 6a and one of the engagement parts 52c can engage with each other in a position far from an axis of the steering shaft 2 in comparison with conventional devices, a load acting on the locking part 6a is decreased in comparison with a conventional device, in correspondence with the increase in the distance between the axis and the engagement position, when the same amount of torque is applied to the steering wheel 1 in the device of this invention and a conventional device. Accordingly, since the strength of the locking part 6a can be reduced in comparison with conventional devices, the locking part 6a can be downsized, and thereby a unit, which is connected to the locking part 6a and makes the locking part 6a slide, such as the electric actuator 6, can be also downsized.

It should be noted that, by increasing the number of the engagement parts 52c to be formed, the rotational angle of the steering shaft 1, over which the steering wheel 1 is turned until the locking part 6a and one of the engagement parts 52c engage with each other when the side face of a portion of the worm wheel 52 where none of the engagement parts 52c is formed is positioned under the locking part 6a, can be decreased.

In addition, the gear of the embodiment mentioned above may be a spur gear, a bevel gear, a hypoid gear or the like, in place of a worm or a worm wheel.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A locking device for a steering shaft having a gear of a reduction gear mechanism axially fastened thereon to substantially prevent movement between the steering shaft and the gear, comprising:
    a locking part which slides into a housing of the steering shaft; and
    an engagement part formed on a side face of the gear, which engages with an end portion of the locking part when the locking part slides into the housing,
    wherein the steering shaft is locked and kept from turning when the locking part and the engagement part engage with each other.

2. The locking device for a steering shaft according to claim 1, wherein the engagement part is configured as a hole into which the end portion of the locking part can slide.

3. The locking device for a steering shaft according to claim 2, wherein the locking part is connected with an electric actuator.

4. The locking device for a steering shaft according to claim 1, wherein the locking part is connected with an electric actuator.

5. A steering apparatus comprising:
    a steering shaft and a gear of a reduction gear mechanism axially fastened to said steering shaft to substantially prevent movement between the steering shaft and the gear;
    a housing for supporting the steering shaft; and
    a locking device for locking the steering shaft, the locking device including:
    a locking part which slides into the housing of the steering shaft; and
    an engagement part formed on a side face of the gear, which engages with an end portion of the locking part when the locking part slides into the housing,
    wherein the steering shaft is locked and kept from turning when the locking part and the engagement part engage with each other.

6. The steering apparatus according to claim 5, wherein the engagement part is configured as a hole into which the end portion of the locking part can slide.

7. The steering apparatus according to claim 6, wherein the locking part is connected with an electric actuator.

8. The steering apparatus according to claim 5, wherein the locking part is connected with an electric actuator.

9. A steering apparatus comprising:
    a steering shaft;
    a worm gear on the steering shaft having a side face having an engagement part;
    a steering assist motor driving said worm gear; and
    a locking part shiftable between a first position spaced from said engagement part and a second position engaging said engagement part;
    whereby said worm gear is prevented from rotating when said locking part is in said second position.

10. The steering apparatus according to claim 9, wherein the engagement part comprises an opening in said side face of the worm gear.

11. The steering apparatus according to claim 10 wherein said locking part comprises a rod.

12. The steering apparatus according to claim 10 wherein said locking part comprises a rod parallel to an axis of said worm gear.

13. The steering apparatus according to claim 9, including an electric actuator operably connected to said locking part.

* * * * *